United States Patent
Ehara et al.

(10) Patent No.: US 8,392,066 B2
(45) Date of Patent: Mar. 5, 2013

(54) ELECTRIC POWER-ASSIST STEERING SYSTEM

(75) Inventors: Shigeki Ehara, Wako (JP); Hiroyuki Tokunaga, Wako (JP); Hiroaki Kobayashi, Wako (JP); Yoshifumi Banno, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 265 days.

(21) Appl. No.: 12/775,726

(22) Filed: May 7, 2010

(65) Prior Publication Data

US 2010/0286868 A1    Nov. 11, 2010

(30) Foreign Application Priority Data

May 8, 2009   (JP) ................................. 2009-113336

(51) Int. Cl.
*A01B 69/00* (2006.01)

(52) U.S. Cl. ......................................................... 701/41

(58) Field of Classification Search ..................... 701/41
See application file for complete search history.

(56) References Cited

U.S. PATENT DOCUMENTS

| | | | |
|---|---|---|---|
| 6,895,357 B2 * | 5/2005 | Lou et al. | 702/151 |
| 2004/0117088 A1 * | 6/2004 | Dilger | 701/41 |

FOREIGN PATENT DOCUMENTS

| | | |
|---|---|---|
| EP | 2039590 | 3/2009 |
| EP | 2039590 A1 * | 3/2009 |
| JP | 11-264725 | 9/1999 |
| JP | 3728991 | 10/2005 |
| JP | 2008-018911 | 1/2008 |

* cited by examiner

*Primary Examiner* — Joseph Burgess
(74) *Attorney, Agent, or Firm* — Rankin, Hill & Clark LLP

(57) ABSTRACT

An electric power-assist steering system that provides a steering assist control in accordance with the steering angle right after the idle stop to reduce an unpleasant steering feeling and is installed in a vehicle having an idle stop mechanism (engine controller) that automatically performs an idle stop operation in a predetermined condition. The electric power-assist steering system includes a torque sensor, a steering angle sensor for detecting a steering angle relative to a midpoint of a steering angle that is learned, an electric motor whose assist force is controlled based on the steering torque and the steering angle, and a resolver for detecting a rotational angle of the electric motor. A steering angle right after the idle stop is determined based on the steering angle detected by the steering angle sensor right before the idle stop and variation in the rotational angle detected by the resolver during the idle stop.

2 Claims, 2 Drawing Sheets

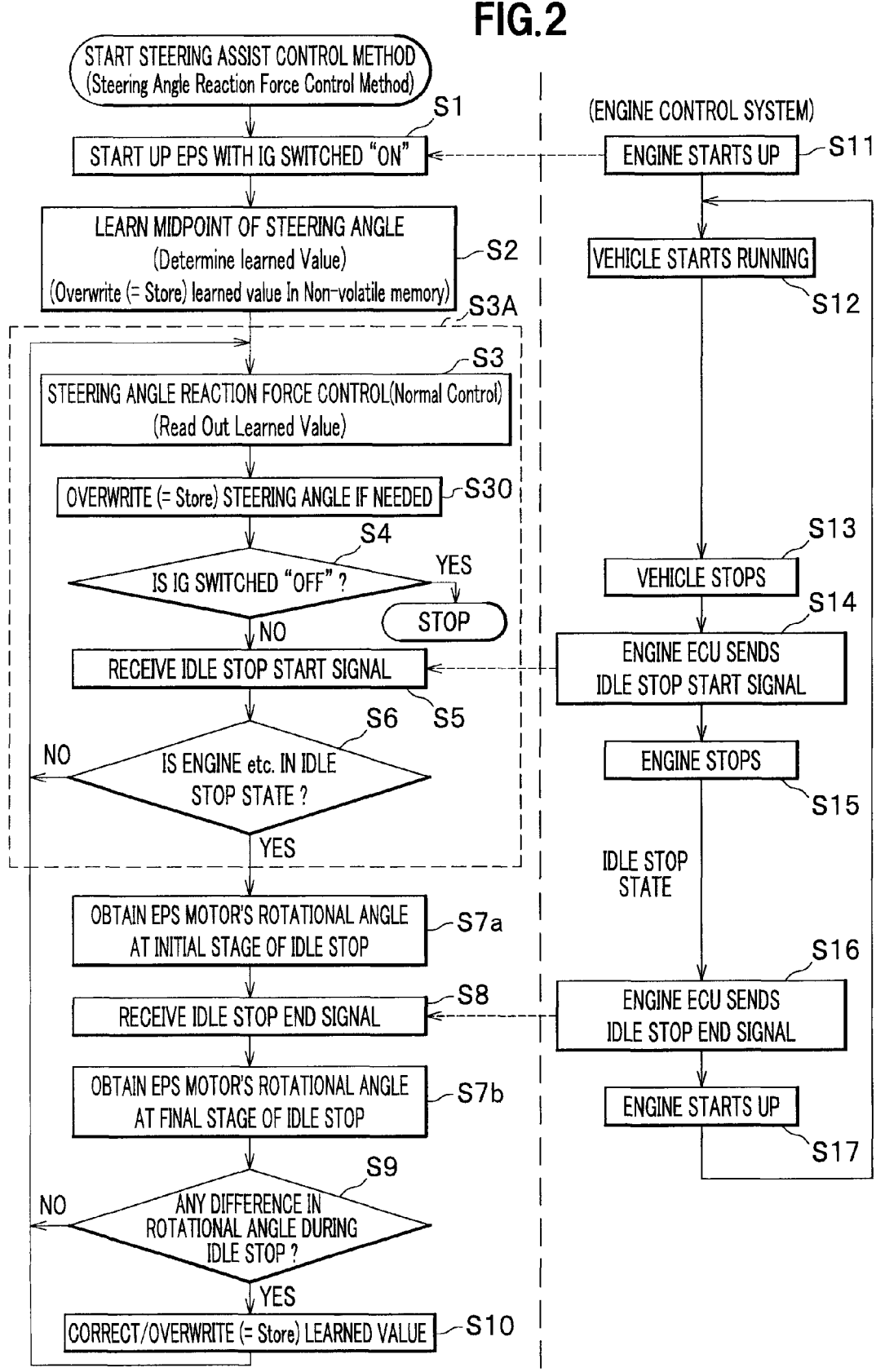

ELECTRIC POWER-ASSIST STEERING SYSTEM

CROSS-REFERENCE TO RELATED APPLICATION

This application claims the foreign priority benefit under 35 U.S.C. §119 of Japanese Patent Application No. 2009-113336 filed on May 8, 2009, the disclosure of which is incorporated herein by reference.

BACKGROUND OF THE INVENTION

1. Field of the Invention

The present invention relates to an electric power-assist steering system for a vehicle, having an idle stop mechanism that automatically performs an idle stop operation under a predetermined condition.

2. Description of the Related Art

Recently, there have been produced more vehicles that perform an idle stop operation so as to reduce $CO_2$ emission and enhance environmental conservation. In every idle stop operation, such a vehicle not only stops the engine, but also reduces power consumption of an electrically powered equipment so as to reduce load on the battery.

In addition, recently almost every vehicle employs an electric power-assist steering system. Such an electric power-assist steering system generates an assist force based on the steering torque and the steering angle, so as to enhance the steering performance of the vehicle. A steering angle sensor that detects a relative angle of a steering angle is used as a steering angle sensor for detecting such a steering angle (see JP 3728991B, for example). Such a steering angle sensor learns a midpoint of the steering angle, and compares a detected steering angle with the midpoint of the steering angle, thereby to obtain an actual steering angle of the steering wheel. In addition, recently more vehicles employ a VSA (Vehicle Stability Assist) system. Such a VSA system provides a highly advanced control such as a steered wheel lock protection at time of braking, a steered wheel slipping protection at time of accelerating and a steered wheel sideslip protection at time of steering.

In the idle stop state, since the engine of the vehicle stops and the vehicle stops and does not run, there is no need of an advanced braking control, and power supply for the VSA is generally shut off. In this state, the VSA obtains a steering angle detected by the steering angle sensor in order for a control of sideslip protection at time of steering, etc., and when power supply for the VSA is shut off, power supply for the steering angle sensor is also shut off. Consequently, every time an idle stop operation is performed, power supply for the steering angle sensor is shut off, so that the midpoint of a steering angle which has been learned is lost, as well.

Meanwhile, in order to keep controllable the steering operation that is a principle operation of a vehicle, power supply for the electric power-assist steering system is maintained even during the idle stop, so as to provide an assist control on the steering operation, not relied on the steering angle. However, although the engine restarts after the idle stop operation, the steering angle sensor cannot detect a steering angle until the steering angle sensor learns a midpoint of the steering angle again, so that the electric power-assist steering system cannot provide a steering assist control based on the steering angle; which may cause an unpleasant steering feeling for a driver.

In order to address the above problem, the present invention has an object to provide an electric power-assist steering system that provides a steering assist control in accordance with the steering angle right after the idle stop operation, thereby to reduce an unpleasant steering feeling for a driver.

SUMMARY OF THE INVENTION

In one aspect of the present invention, there is provided an electric power-assist steering system installed in a vehicle having an idle stop mechanism that automatically performs an idle stop operation in a predetermined condition, and the electric power-assist steering system includes a torque sensor for detecting a steering torque, a steering angle sensor for detecting a steering angle relative to a midpoint of a steering angle that is learned, an electric motor whose assist force is controlled based on the steering torque and the steering angle, and a resolver for detecting a rotational angle of the electric motor, wherein a steering angle right after the idle stop is determined based on the steering angle detected by the steering angle sensor right before the idle stop and variation in the rotational angle detected by the resolver during the idle stop.

During the idle stop, power supply for the steering angle sensor is shut off, but power is supplied for the torque sensor, the electric motor and the resolver of the electric power-assist steering system. Hence, even during the idle stop, the electric motor is capable to apply an assist force not relied on the steering angle but relied on the steering torque. The resolver is capable to detect the rotational angle of the electric motor and provide a feedback control and the like of the electric motor control during the idle stop.

In the present invention, variation in the rotational angle of the electric motor during the idle stop is detected by the resolver. The electric motor is coupled with the steered wheels via the pinion shaft and rack shaft, etc., so that variation in the steering angle of the steered wheels 10 can be calculated based on variation in the rotational angle of the electric motor. It is possible to determine the steering angle right after the idle stop without learning the midpoint of the steering angle by considering the above variation in the steering angle during the idle stop (i.e. variation in the rotational angle of the electric motor) along with the steering angle detected by the steering sensor right before the idle stop.

Accordingly, even though the steering angle during the idle stop cannot be obtained, it is possible to provide the steering assist control relied on the steering angle, thereby to reduce an unpleasant feeling for a driver.

Other features and advantages of the present invention will become more apparent from the following detailed description of the invention when taken in conjunction with the accompanying exemplary drawings.

BRIEF DESCRIPTION OF THE DRAWINGS

FIG. 2 is a flow chart of a steering assist control method (steering angle reaction force control method) carried out in the electric power-assist steering system according to the embodiment of the present invention.

DETAILED DESCRIPTION OF THE PREFERRED EMBODIMENT

Figure 1:
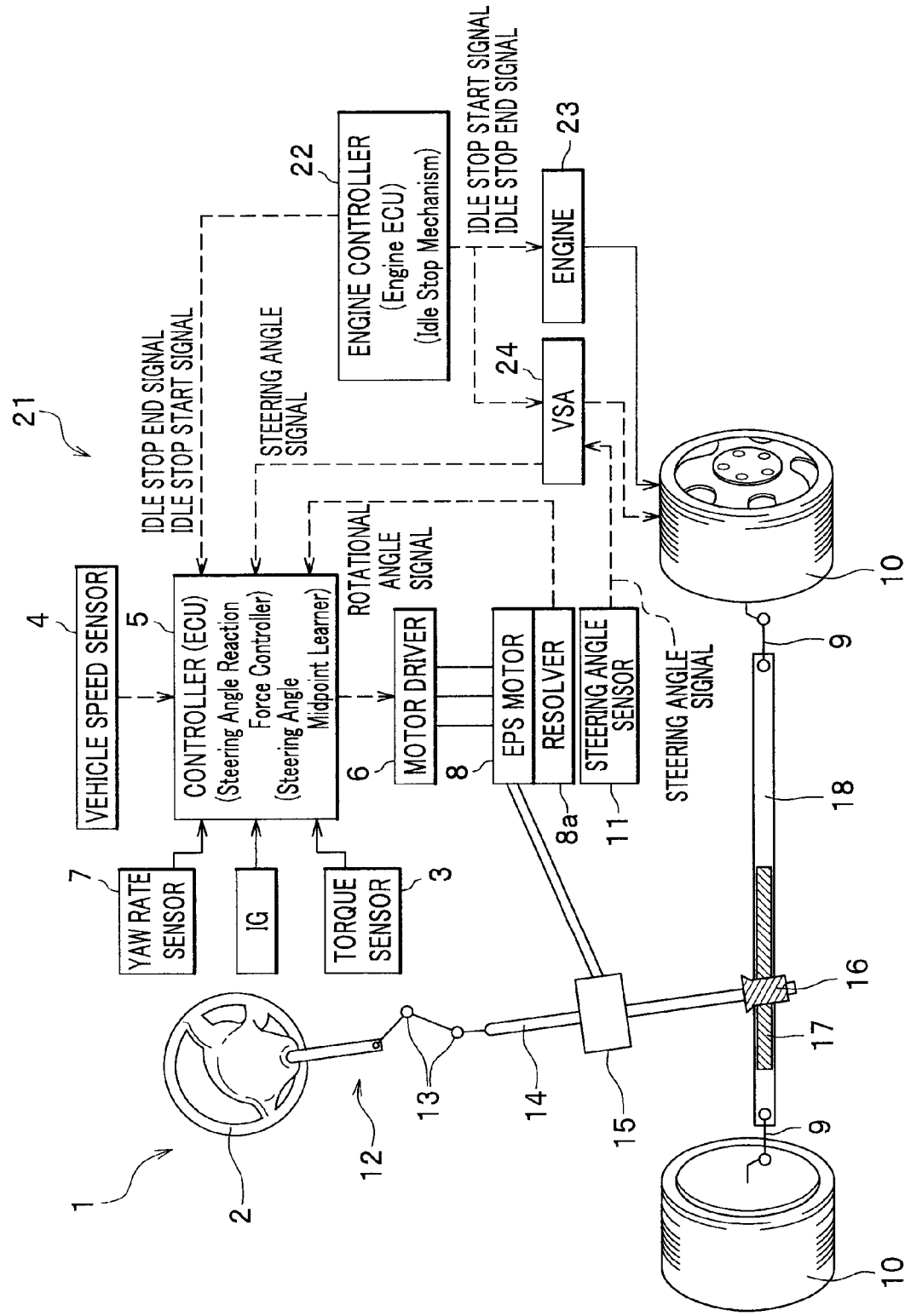
FIG. 1 is a schematic diagram of a vehicle including an electric power-assist steering system according to an embodiment of the present invention is installed.

Detailed descriptions are provided on an embodiment of the present invention with reference to the attached drawings, hereinafter. Note that the same numerical references are used for the same components in the drawings, and repeated descriptions will be omitted.

As shown in FIG. 1, the vehicle 21 includes the electric power-assist steering system 1 for a steering control, the engine controller (engine ECU) 22 and the engine 23 for a driving control, the VSA 24 for a braking control, and the ignition switch IG for starting up the above components. A steering angle (signal) detected by the steering angle sensor 11 may be used in the electric power-assist steering system 1 and in the VSA 24; therefore, the steering angle 11 may be included in (shared by) both the electric power-assist steering system 1 and the VSA 24, for example.

The electric power-assist steering system 1 includes the steering wheel 2, the steered wheels 10 and a coupling member for coupling the steering wheel 2 and the steered wheels 10. The coupling member transmits a steering torque applied to the steering wheel 2 to the steered wheels 10 and turns the steered wheels 10. The coupling member includes the steering shaft 12, the universal joint 13, the pinion shaft 14, the deceleration mechanism 15, the pinion gear 16, the rack gear 17, the rack shaft 18 and the tie rod 9.

The steering shaft 12 is integrally jointed to the steering wheel 2, and is coupled with the pinion shaft 14 via the universal joint 13. The rack gear 17 is provide to the rack shaft 18 in such a manner that the rack gear 17 is meshed with the pinion gear 16 at one end of the pinion shaft 14. With this meshing between the pinion gear 16 and the rack gear 17, a rotational motion of the pinion shaft 14, the steering shaft 12 and the steering wheel 2 is converted to a reciprocal motion in the longitudinal direction of the rack shaft 18 (i.e. in the vehicle width direction). The steered wheel 10 is coupled to each end of the rack shaft 18 via the tie rod 9.

The electric power-assist steering system 1 further includes the EPS motor (electric motor) 8. The EPS motor 8 transmits an assist torque (assist force) generated thereby to the deceleration mechanism 15 in the forward or reverse direction relative to the steering direction of the steering wheel 2. Then, the EPS motor 8 applies the generated assist torque to the pinion shaft 14 via the deceleration mechanism 15. Accordingly, the electric power-assist steering system 1 transmits the steering torque applied to the steering wheel 2 by a driver to the pinion shaft 14, and also transmits the assist torque generated by the EPS motor 8 to the pinion shaft 14, thereby to steer the steered wheels 10 through the rack and pinion mechanism including the pinion gear 16 and the rack gear 17. A three phase brushless motor may be used as the EPS motor 8.

The deceleration mechanism 15 may be a torque transmission member that transmits the assist torque generated by the EPS motor 8 to the pinion shaft 14, and a worm gear mechanism may be used as this deceleration mechanism 15, for example. The worm gear mechanism may include a worm shaft coupled with a motor shaft of the EPS motor 8, the worm gear provided on this worm shaft, and the worm wheel meshed with this worm gear and coupled with the pinion shaft 14. As described above, since the steering wheel 2 (steered wheels 10) and the EPS motor 8 are mechanically coupled with each other, the steering angle (the steering angle of the steering wheel 2 or the steered angle of the steered wheels 10) can be estimated (calculated) based on the rotational angle (rotational speed) of the EPS motor 8.

The electric power-assist steering system 1 includes the vehicle speed sensor 4 that detects the vehicle speed (signal) of the vehicle 21 and sends this speed to the controller (ECU) 5, the yaw rate sensor 7 that detects a yow rate and sends this yow rate (signal) to the controller 5, the torque sensor 3 that detects a steering torque and sends this steering torque (signal) to the controller 5, the resolver 8a that detects a rotational angle of the EPS motor 8 and sends this rotational angle (signal) to the controller 5, and the steering sensor 11 that detects a steering angle relative to the midpoint of a learned steering angle and sends this steering angle (signal) to the VSA 24. The VSA 24 sends the received steering angle (single) to the controller 5.

The controller 5 functions as a steering angle reactive force controller for controlling the electric power-assist steering system 1, and also functions as a steering angle midpoint learner. When functioning as the steering angle reaction force controller, the controller 5 works to generate a reaction force in the direction toward the midpoint of the steering angle. In order to make the controller 5 function as the steering angle reaction force controller, it is required to learn and store the steering angle when the steered wheels 10 are in a straight-forward state, that is, the midpoint of the steering angle. Hence, before working as the steering angle reaction force controller, the controller 5 first functions as the steering angle midpoint learner to learn the midpoint of the steering angle. The learning of the midpoint of the steering angle is carried out in such a manner that the (relative) steering angle in a stable straight running at a predetermined vehicle speed is learned and stored as the midpoint of the steering angle. Specifically, during a predetermined learning time period, the steering angle is learned and stored as the midpoint of the steering angle in the following conditions: the vehicle speed becomes a predetermined speed or more, an absolute value of the yaw rate becomes a predetermined value or less, an absolute value of the steering torque becomes a predetermined value or less, and a range of variation in the steering angle during the predetermined learning time period becomes a predetermined value or less. Detailed learning conditions are as follows.

<<Learning Conditions>>
1. The vehicle speed of the vehicle 21 becomes the predetermined value VEL1 or more.
2. The yaw rate generated on the vehicle 21 becomes the predetermined value YAW1 or less.
3. The steering torque generated on the steering shaft 12 is within the predetermined value TRQ1.
4. The range of variations of the steering angle becomes ΔDEG1 or less.
5. the conditions of 1 to 4 are maintained during the time period TIM1.

Various predetermined values for the learning conditions (VEL1, YAW1, TRQ1,ΔDEG1, TIM1) may be set based on the performances required for the vehicle 21 and the sensor sensitivity of the yaw rate sensor 7, for example.

When functioning as the steering angle reaction force controller in the normal control operation, the controller 5 sends a control signal to the motor driver 6. The motor driver 6 supplies the EPS motor 8 with three phase driving current in accordance with the control signal. The EPS motor 8 rotates and generates a reaction force with the supplied driving current. The rotation (angle) of the EPS motor 8 is detected by the resolver 8a and is sent to the controller 5, and then the controller 5 performs a feed back control, etc. based on this rotational angle.

On the other hand, the engine controller 22 and the engine 23 provide the driving control so as to drive the steered wheels 10. The engine controller 22 also serves as the idle stop mechanism such that the engine controller 22 starts the idle stop in an automatic manner in a predetermined condition, and stops the engine 23, and thereafter the controller 22 starts up the engine 23 and stops the idle stop. Specifically, in response to the idle-stop start signal sent by the engine controller 22, the engine 23 stops and then the idle stop is started. Then, in response to the idle-stop end signal sent by the engine controller 22, the engine 23 starts up and then the idle stop is stopped.

The idle-stop start signal is sent to the engine 23 as well as to the controller 5 and the VSA 24. The idle-stop end signal is also sent to the engine 23 as well as to the controller 5 and the VSA 24.

The VSA 24 provides various braking controls for the steered wheels 10, such as wheel lock prevention at time of braking, slipping prevention of wheels at time of accelerating, and sideslip prevention at time of steering. These various braking controls are carried out while the vehicle 21 is running, and are not carried out during the idle stop when the vehicle 21 stops. During the idle stop, power supply for the VSA 24 is shut off so as to stop the VSA 24. Specifically, when receiving the idle-stop start signal, the VSA 24 stops; and thereafter, the VSA 24 starts when receiving the idle-stop end signal.

The VSA 24 receives the steering angle (signal) from the steering angle sensor 11 to provide a braking control such as sideslip prevention at time of steering. Then, the VSA 24 sends the received steering angle (signal) to the controller 5. Consequently, when the VSA 24 and the steering angle sensor 11 stop at time of the idle stop, the steering angle (signal) cannot be sent from the VSA 24, and the controller 5 cannot receive or obtain the steering angle (signal), so that the steering angle may change during the idle stop, which causes an error in the learned midpoint of the steering angle.

To counter such a problem, the controller 5 is configured to receive the idle-stop start signal and the idle-stop end signal so as to grasp the time period of the idle stop, and then determine the steering angle right after the idle stop based on the steering angle detected by the steering sensor 11 right before the idle stop and variation in the rotational angle detected by the resolver 8a during the idle stop. Accordingly, the steering assist control relied on the steering angle can be carried out even right after the idle stop, thereby to reduce unpleasant feeling for a driver.

FIG. 2 is a flow chart of the steering assist control method (steering angle reaction force control method) in the electric power-assist steering system 1 according to the embodiment of the present invention. Since this steering assist control method works along with the idle stop operation of the engine system controlled by the engine controller 22 and the like, another flow chart of the idle stop operation in the engine control system is also illustrated on the right side of the FIG. 2.

First, descriptions are provided on the flow chart of the idle stop operation of the engine control system.

At the step S11, the engine 23 starts up when the ignition switch IG is switched on. Next, at the step S12, the vehicle starts running. At the step S13, the vehicle 21 stops in the predetermined condition and at the step S14, the engine controller (engine ECU) 22 sends the idle-stop start signal. The predetermined condition in which the engine controller 22 sends the idle-stop start signal may be a condition in which the brake pedal is kept pushed even after the vehicle 21 stops or a condition in which power consumption in electric equipment such as an air conditioner becomes at a predetermined value or less, for example.

At the step S15, the engine 23 receives the idle-stop start signal and then stops, so that the engine 23 comes in the idle stop state. At the step 16, based on the detected result such that a driver takes his or her foot off from the brake pedal or pushes down the brake pedal, the engine ECU (engine controller) 22 sends the idle-stop end signal. At the step S17, the engine 23 receives the idle-stop end signal and then starts up, and also stops the idle stop, and returns to the step S12. The flow of the idle stop control in the engine control system has been described above. Hereinafter, the flow of the steering assist control method is described in associated with the above described flow.

At the step S1, the controller 5 starts up the electric power-assist steering system (EPS) 1 including the controller 5 itself when the ignition switch IG is switched on. The process at the step S1 is carried out along with the process at the step S11.

Next, at the step S2, the controller 5 serves as the steering angle midpoint learner and performs the learning operation of the steering angle midpoint. In this learning step, the controller 5 sets the steering angle which is the midpoint of the steering angle to be a learned value and stores the value. The learned value (midpoint of the steering angle) is stored by overwriting this value in a predetermined area of the learned value storage of a non-volatile memory. Therefore, the non-volatile memory of the controller 5 is updated with a latest learned value. In this case, the learned value (midpoint of the steering angle) should be corrected and be overwritten if the steering angle varies due to a steering during the idle stop. In the embodiment of the present invention, the learned value is stored in a non-volatile memory, but the present invention is not limited to this, and a memory of any type may be used if the value can be securely stored during the idle stop and thereafter. The process at the step S2 is carried out right after the vehicle 21 starts running at the step S12.

At the step S3, the controller 5 serves as the steering angle reaction force controller, and provides the normal control of the electric power-assist steering system 1 including the steering angle reaction force control. In this steering angle reaction force control, the controller 5 provides a control to read out the learned value (midpoint of the steering angle) that has been stored, and generate the reaction force in the midpoint of the steering angle direction based on this read-out learned value (midpoint of the steering angle).

At the step S30, the controller 5 stores a current steering angle if needed. The current steering angle is stored in such a manner that the current steering angle is overwritten in a predetermined area for the latest steering angle storage of the non-volatile memory. Whereby, the non-volatile memory of the controller 5 is always updated with a latest steering angle, so that the steering angle right before the idle stop can be stored. In the embodiment of the present invention, the current steering angle is stored in the non-volatile memory, but the present invention is not limited to this, and a volatile memory may be used if this volatile memory can preserve the stored value during the idle stop and thereafter.

At the step S4, the controller 5 determines whether or not the ignition switch IG is switched off. If the ignition switch IG is switched off ("Yes" at S4), the controller 5 stops the steering assist control method, and if the ignition switch IG is not switched off ("No" at S4), the controller 5 proceeds to the step S5.

At the step S5, the controller 5 receives the idle-stop start signal. The process at the step S5 is carried out along with the process at the step S14. At the step S6, in response to the idle-stop start signal, the controller 5 determines whether or not the engine 23, etc. is in the idle stop state. If the engine 23, etc. is not in the idle stop state ("No" at S6), the controller 5 returns to the step S3, and if the engine 23. etc. is in the idle stop state ("Yes" at S6), the controller 5 proceeds to the step S7a. In the steering angle reaction force control at the step S3 (normal control), the interrupt controls at the steps S30, S4, S5, S6 may be carried out if needed; therefore, the processes are not always carried out in the order shown in the FIG. 2. Specifically, the steps S3, S30, S4, S5, S6 may be framed as a large step S3A, which handles the steering angle reaction force control (normal control), and the processes at the steps S30, S4, S5, S6 may be carried out if needed.

At the step S7a, the controller 5 obtains the rotational angle of the EPS motor 8 at the initial stage of the idle stop, detected by the resolver 8a. Please note that during the idle stop, the controller 5 cannot obtain the steering angle from the steering angle sensor 11 since the VSA 24 stops. Hence, the controller 5 estimates variation in the steering angle by using variation in the rotational angle of the EPS motor 8 detected by the resolver 8a.

At the step S8, the controller 5 receives the idle-stop end signal. The process at the step S8 is carried out along with the operation at the step S16.

At the step S7b, the controller 5 obtains the rotational angle of the EPS motor 8 at the final stage of the idle stop, detected by the resolver 8a. Finally, at the step S9 it is desired to obtain variation in the rotational angle of the EPS motor 8 from at the initial stage to at the final stage of the idle stop; therefore, the rotational angle of the EPS motor 8 is time-integrated from at the initial stage to at the final stage of the idle stop, thereby to calculate the variation in the rotational angle thereof.

At the step S9, the controller 5 calculates the difference (variation) in the rotational angle of the EPS motor from at the initial stage to at the final stage of the idle stop, and based on the calculated difference (variation), determines whether or not there is any variation in the rotational angle during the idle stop. Specifically, it is determined whether or not the difference (variation) equals to the predetermined value or more. If there is no variation in the rotational angle during the idle stop (i.e. the difference is less than the predetermined threshold value) ("No" at S9), the controller 5 returns to the step S3. In this case, it can be considered that there is no variation in the steering angle during the idle stop, therefore, the learned value (midpoint of the steering angle) stored can be used (read out) for performing the steering angle reaction force control (normal control) at the step S3. On the other hand, if there is some variation in the rotational angle during the idle stop (i.e. the difference equals to the predetermined value or more) ("Yes" at S9), the controller 5 proceeds to the step S10. In this case, it can be considered that there is some variation in the steering angle during the idle stop, therefore, the steering angle (midpoint) has changed (right) after the idle stop. Consequently, there occurs some difference between the midpoint of the actual steering angle and the midpoint of the steering angle in the control.

At the step S10, the controller 5 determines the steering angle (midpoint) right after the idle stop based on the steering angle detected by the steering sensor 11, stored right before the idle stop at the step S30 and variation in the rotational angle detected by the resolver 8a during the idle stop, and overwrite this determined steering angle (midpoint) in the predetermined area for the learned value storage, as similar to the step S2. In this way, since the difference in the learned value (midpoint of the steering angle) is corrected, the steering angle reaction force control (normal control) at the step S3 can be carried out by using (reading out) the stored learned value (midpoint of the steering angle) even right after the idle stop.

The present invention provides an electric power-assist steering system that can provide a steering assist control in accordance with the steering angle right after the idle stop, thereby to reduce an unpleasant steering feeling for a driver.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An electric power-assist steering system, comprising:
   a torque sensor for detecting a steering torque;
   a steering angle sensor for detecting a steering angle relative to a midpoint of a steering angle that is learned;
   an electric motor whose assist force is controlled based on the steering torque detected by the torque sensor and the steering angle detected by the steering angle sensor;
   a resolver for detecting a rotational angle of the electric motor;
   an idle stop mechanism that automatically performs an idle stop of an engine based upon a predetermined condition; and
   a controller that determines a steering angle right after the idle stop is performed by the idle stop mechanism based on the steering angle detected by the steering angle sensor right before the idle stop and variation in the rotational angle detected by the resolver during the idle stop.

2. A vehicle, comprising: an engine that drives wheels of the vehicle;
   an idle stop mechanism that automatically performs an idle stop of the engine based upon a predetermined condition;
   a torque sensor for detecting a steering torque;
   a steering angle sensor for detecting a steering angle relative to a midpoint of a steering angle that is learned;
   an electric motor whose assist force is controlled based on the steering torque detected by the torque sensor and the steering angle detected by the steering angle sensor;
   a resolver for detecting a rotational angle of the electric motor; and a controller that determines a steering angle right after the idle stop initiated by the idle stop mechanism, wherein the steering angle determined right after the idle stop is based on the steering angle detected by the steering angle sensor right before the idle stop and variation in the rotational angle detected by the resolver during the idle stop.

* * * * *